(12) United States Patent
Huseman

(10) Patent No.: US 7,987,934 B2
(45) Date of Patent: Aug. 2, 2011

(54) METHOD FOR CONTROLLING ENGINE SPEED IN A HYBRID ELECTRIC VEHICLE

(75) Inventor: Steven C. Huseman, Noblesville, IN (US)

(73) Assignee: GM Global Technology Operations LLC, Detroit, MI (US)

(*) Notice: Subject to any disclaimer, the term of this patent is extended or adjusted under 35 U.S.C. 154(b) by 1015 days.

(21) Appl. No.: 11/731,645

(22) Filed: Mar. 29, 2007

(65) Prior Publication Data

US 2008/0236921 A1    Oct. 2, 2008

(51) Int. Cl.
B60K 6/04    (2006.01)
B60W 10/04   (2006.01)

(52) U.S. Cl. .................. 180/65.21; 180/65.28

(58) Field of Classification Search ........... 180/65.21, 180/65.24, 65.265, 65.28, 65.29; 701/90, 701/91, 100; 74/335, 337
See application file for complete search history.

(56) References Cited

U.S. PATENT DOCUMENTS

| | | | |
|---|---|---|---|
| 4,305,254 A * | 12/1981 | Kawakatsu et al. ............ 60/716 |
| 4,335,429 A * | 6/1982 | Kawakatsu ................... 701/102 |
| 4,407,132 A * | 10/1983 | Kawakatsu et al. ............ 60/716 |
| 5,788,597 A * | 8/1998 | Boll et al. ..................... 477/4 |
| 6,278,915 B1 * | 8/2001 | Deguchi et al. ............... 701/22 |
| 6,539,820 B2 * | 4/2003 | Markyvech .................... 74/83 |
| 6,832,148 B1 | 12/2004 | Bennett |
| 6,868,318 B1 | 3/2005 | Cawthorne |
| 7,154,236 B1 | 12/2006 | Heap |
| 7,426,910 B2 * | 9/2008 | Elwart ....................... 123/46 E |
| 7,840,333 B2 * | 11/2010 | Mehrer et al. ................ 701/100 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |

(Continued)

*Primary Examiner* — J. Allen Shriver, II
*Assistant Examiner* — Bridget Avery

(57) ABSTRACT

A method for controlling operation of a hybrid powertrain is proposed, the hybrid powertrain comprising an internal combustion engine, an electric energy storage device, an electric machine, and an electro-mechanical transmission. The engine and the electric machine and the transmission are operative to transmit torque therebetween to generate an output. The method comprises determining optimum engine operation and an engine capability, and an operator torque request. A limit to the engine capability is determined based upon optimum engine operation, engine capability, and states of the parameters of the electrical energy storage device. Power limits are determined. The limit to the engine capability is adjusted based upon the power limits of the energy storage device. The engine operation is controlled based upon the engine capability and the adjusted limit to the engine capability.

17 Claims, 5 Drawing Sheets

U.S. PATENT DOCUMENTS

| | | |
|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

* cited by examiner

METHOD FOR CONTROLLING ENGINE SPEED IN A HYBRID ELECTRIC VEHICLE

TECHNICAL FIELD

This invention pertains generally to control systems for hybrid powertrain control systems, including those employing electro-mechanical transmissions.

BACKGROUND OF THE INVENTION

Hybrid vehicles (HEVs) have propulsion systems that consist of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Powertrain architectures for HEVs manage the input and output torques of various prime movers, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e., input-split, output-split and compound-split configurations) thereby enabling high-torque continuously variable speed ratios, electrical energy-dominated launches, regenerative braking, engine off idling, and two-mode operation.

As noted, such complex EVT HEVs utilize one or more electric machines and require advanced energy transmission, conversion and storage systems to supply electrical energy to and receive and store electrical energy from these machines, and typically comprise, for example, at least one electric machine, power inverter module, power bus, electrical energy storage device, such as a battery, as well as various control electronics, control algorithms and other associated items. The energy storage system (ESS) may comprise any suitable energy storage system that is adapted for high-density energy storage, including a battery, ultracapacitor, or other high-density energy storage device. As used herein, reference to a battery includes not only a single battery, also includes any combination of single or multiple batteries, or cells thereof, into a battery pack or array, or a plurality of battery packs or arrays. As used herein, the term battery generally refers to any secondary or rechargeable battery.

Significant attention has been given to maintaining the operational performance of batteries used in HEV applications, including maintaining the battery pack state of charge (SOC). The SOC is defined generally as the ratio of the residual charge in a battery relative to its full charge capacity. Various hardware and software control strategies have been adjusted for determining and maintaining the SOC of the battery.

Vehicles, including HEVs, are expected to accelerate in response to operator torque requests, including achieving various launch characteristics, e.g., an elapsed time to reach a speed. A vehicle launch is generally associated with starting the motion of the vehicle from a stop, typically characterized by the speed of the vehicle, such as from zero km/h to thirty km/h, and a required torque output. Launch conditions also exist during other periods of vehicle operation, such as acceleration from a low-speed interval, or seeking to maintain or increase speed while negotiating an incline.

A hybrid system application can underutilize the energy storage system, due to several factors including the size and power capacity of the primary power source, i.e., the internal combustion engine, and, the specific speed/load duty cycle of the vehicle. In at least one specific case the maximum energy storage usage has been shown to be about half of an allowable usage limit. In a hybrid system, it is desirable to make full use of the energy storage system in transient operating conditions, i.e., acceleration and decelerations, to reduce the fuel usage.

Current operating systems typically optimize fuel economy by minimizing the power losses associated with operation at a specific output torque and speed (thus a specific power). This is accomplished by solving equations at quasi-steady state operating points to direct power flows from the primary power source or the secondary power source.

Current system operation can be described with reference to an operator torque request (To_req) in the form of a throttle tip-in/tip-out maneuver. The operator torque request (To_req) is typically input to the system via the throttle, which is linked to an output torque command (To_cmd) in the hybrid control system. The hybrid control system monitors system operation at each operating point as the vehicle accelerates, and determines a power flow from the electrical machine and the engine through the EVT for each point, typically using engine speed and torque as two key criteria to determine the power flow from the primary power source and the hybrid transmission system. Determining these points along with the operator torque request solves the dynamic system equations and determines the power flow from the energy storage system. In this maneuver the engine speed changes to follow the optimal quasi-steady state operating point. It may accelerate to a high engine speed from idle and back down as the throttle input is reduced back to zero, with additional torque generated by energy transfer to the electric machine to the EVT. In the case of a throttle tip in to a steady state point, the engine reaches its optimal operating speed by following the optimal engine speed trajectory as defined by the current control system logic. In this system there are fixed ramp rates for engine speed changes. The fixed ramp rates are typically set as maximum control limits, and do not adjust for transient maneuvers. Solving the equations to meet the operator torque request in this manner does not optimize the system for transient operation.

What is needed is an optimization scheme for a hybrid powertrain system which looks at the combination of the power sources over a range of operating points that occur during a transient event, e.g., a vehicle acceleration event resulting from an operator torque request. It is desirable to develop an optimization scheme for vehicle operation which optimizes the system for transient operation and more fully utilizes the capability of the electrical energy storage system while ensuring the management and protection of the ESS under launch conditions, to meet the operator torque request.

SUMMARY OF THE INVENTION

The invention may be described generally as a method for controlling operation of a hybrid powertrain, the hybrid powertrain comprising an internal combustion engine, an electric energy storage device, an electric machine, and an electromechanical transmission. The energy storage system and electric machine are electrically-operatively coupled for power flow therebetween. The engine, electric machine, and the electro-mechanical transmission are mechanically-operatively coupled to transmit power therebetween to generate a power flow to an output. The method comprises determining optimum engine operation and an engine capability, and an operator torque request. States of parameters of the electrical energy storage device are monitored. A limit to the engine capability is determined based upon the optimum engine operation, the engine capability, and the states of the parameters of the electrical energy storage device. Power limits of the energy storage device are determined based upon the states of the parameters of the energy storage device. The limit to the engine capability is adjusted based upon the power limits of the energy storage device. The engine operation is controlled based upon the engine capability and the adjusted limit to the engine capability. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DESCRIPTION OF THE PREFERRED EMBODIMENT

Figure 1:
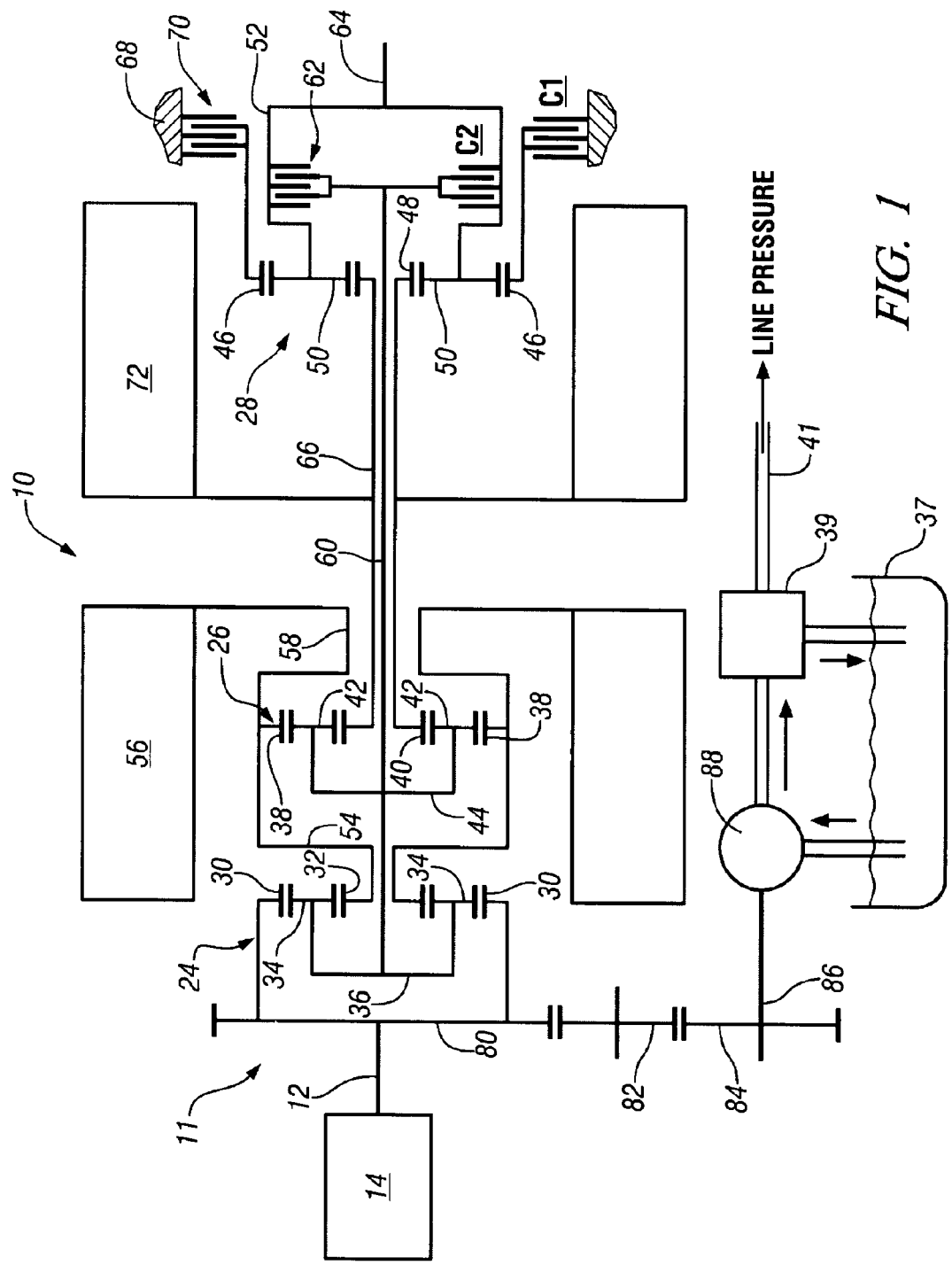
FIGS. 1 and 2 are schematic diagrams of an exemplary architecture for a control system and powertrain, in accordance with the present invention.

Referring now to the drawings, wherein the depictions are for the purpose of illustrating the invention only and not for the purpose of limiting the same, FIG. 1 depicts a schematic diagram of hybrid powertrain comprising an internal combustion engine, transmission, and accompanying control module 5 that have been constructed in accordance with an embodiment of the invention.

The invention described herein may be used as a control algorithm for operation in a hybrid powertrain system of the type described in commonly assigned U.S. Pat. No. 5,931, 757, entitled TWO-MODE COMPOUND SPLIT ELECTRO-MECHANICAL VEHICULAR TRANSMISSION, which is incorporated by reference in its entirety. The hybrid powertrain disclosed therein comprises a compound-split electrically variable transmission for a hybrid electric vehicle which has characteristics of both a series and a parallel device which generally comprise at least one drive motor, such as an internal combustion engine, at least one electric machine that is adapted to both provide propulsion to the vehicle and generate electric power for storage on the vehicle, and the ESS which typically comprises a rechargeable or secondary battery, as described herein.

Figure 2:
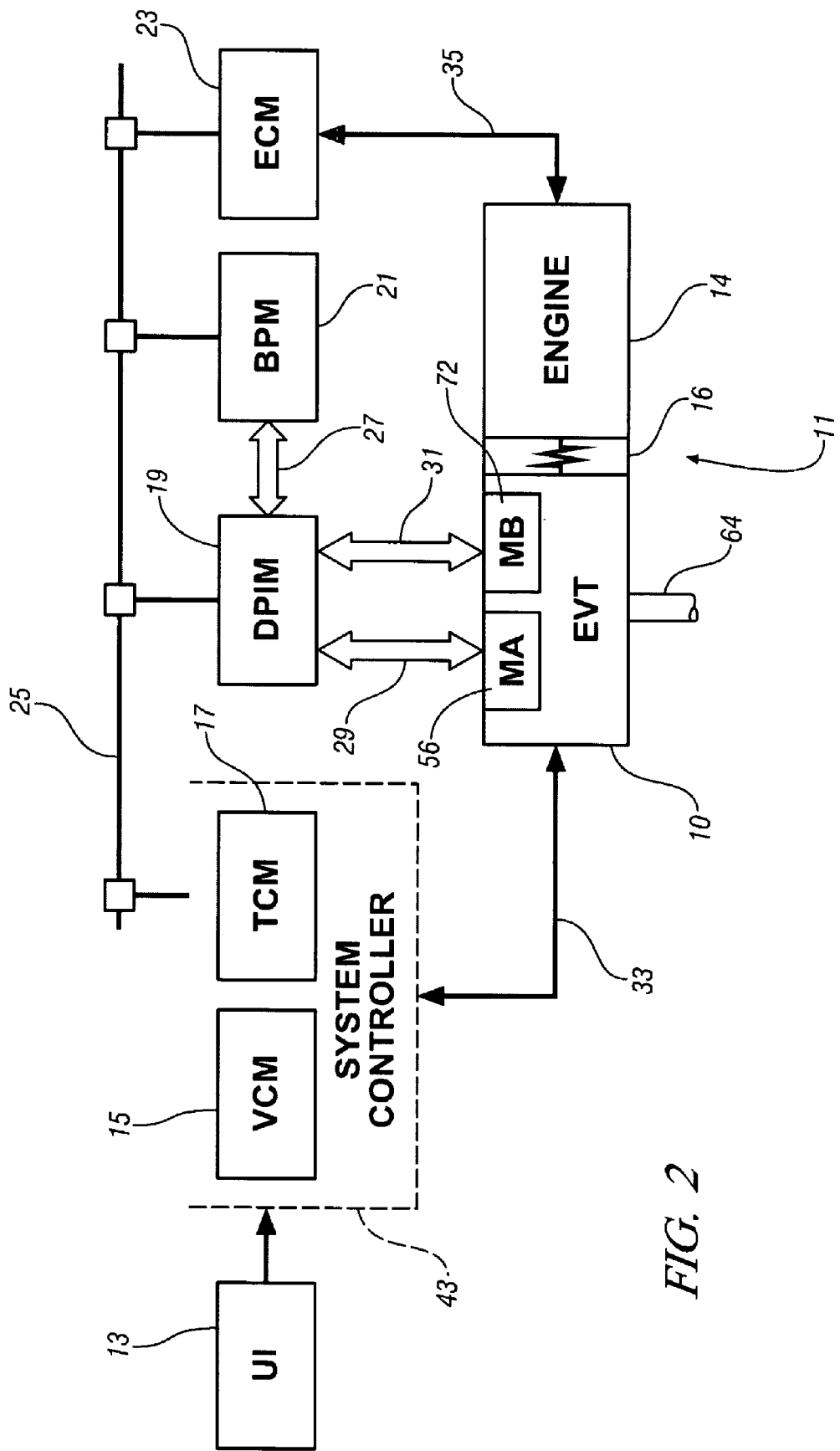

Referring now to FIGS. 1 and 2, a vehicular powertrain system 10 is now described, comprising an internal combustion engine and an electric energy storage device which are adapted to transfer energy to electric machines and an electro-mechanical transmission. The engine and the electric machines and the electro-mechanical transmission are selectively operative to transmit torque therebetween to generate an output, typically a driveline, and having characteristics of torque and speed. The electric machines and the electro-mechanical transmission comprise one representative form of a multi-mode, compound-split, electrically variable transmission (EVT) particularly suited for implementing the controls of the present invention and designated generally by the numeral 10. The EVT 10 has an input member 12 preferably comprising a shaft that is directly driven by the engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine, which is readily adapted to provide its available power output through shaft 12. The engine 14 preferably operates, after start-up, and during the majority of its input, at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to by a sleeve shaft 58 to a first motor/generator 56, referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to an output member 64. When the EVT 10 is used in a land vehicle, the output member 64 is typically connected to the vehicular axles (not shown) that may, in turn, terminate in the drive members (also not shown), to provide tractive torque thereto. The drive members are either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72, referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero.

Engine 14 is preferably electronically controlled by engine control module (ECM) 23 as illustrated in FIG. 2. ECM 23 is a conventional microprocessor-based diesel engine control module comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein As should be apparent from the foregoing description the EVT 10 selectively receives power from the engine 14. As will now be explained with continued reference to FIG. 1, the EVT also receives power from an electric storage device, i.e., the ESS, such as one or more batteries in battery pack module (BPM) 21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high-voltage, DC-coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based control modules comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31, which is converted by the electric motor into torque which is transmitted to the transmission, referred to respectively as motor torques Ta and Tb. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines, and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

Each of the aforementioned control modules, i.e., system controller 43, DPIM 19, BPM 21, ECM 23, is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. The various modules communicate via controller area network (CAN) bus 25 to transfer information. The CAN bus 25 effects structured communication of control parameters and commands between the various modules. The specific communication protocol utilized is application-specific. For example the preferred protocol for heavy duty applications is the Society of Automotive Engineers standard J1939.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 40, and 100 milliseconds during ongoing engine and vehicle operation. Alternatively, algorithms may be executed in response to occurrence of an event.

In the exemplary embodiment, system controller 43 comprises a pair of microprocessor based control modules designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. Also illustrated is user interface (UI) block 13 which comprises such inputs to system controller 43 such as vehicle throttle position, push button shift selector (PBSS) for available drive range selection, brake effort and fast idle requests among others, from which an operator torque request (To_req) is determined.

System controller 43 determines an engine torque command Te_cmd which is provided to ECM 23. The engine torque command Te_cmd is representative of the EVT torque contribution desired from the engine. System controller 43 also determines an engine speed command, Ne_cmd, representative of the desired input speed to the EVT, which in the direct coupled arrangement between the engine and the EVT is also the desired engine speed operating point. With the direct coupled arrangement depicted herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein. Desired input speed operating points are preferably determined as disclosed in commonly assigned and co-pending U.S. patent application Ser. Nos. 10/686,508 and 10/686,034 which are incorporated herein by reference. A preferred speed control for a hybrid transmission is described in detail in commonly assigned and co-pending U.S. patent application Ser. No. 10/686,511 which is incorporated herein by reference.

Figure 3:
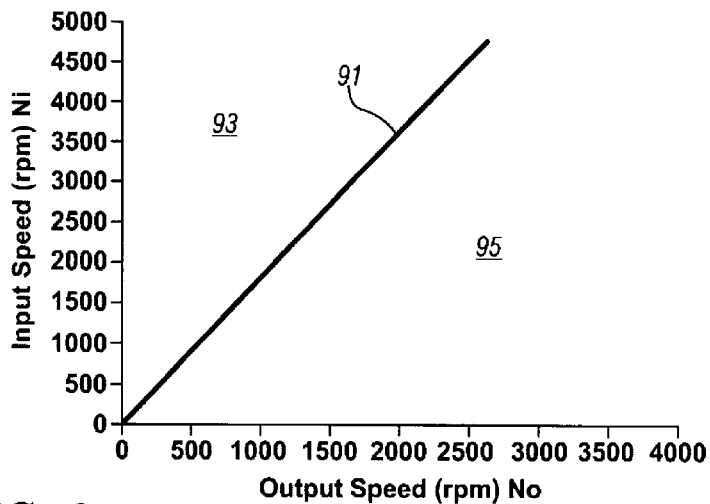
FIG. 3 is a data graph, in accordance with the present invention.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio operation. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g., mass, size, cost, inertial capabilities) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g., mass, size, cost, inertial capabilities) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

As surmised from the above description, the energy storage system and electric machine are electrically-operatively coupled for power flow therebetween, and the engine, electric machine, and the electro-mechanical transmission are mechanically-operatively coupled to transmit power therebetween to generate a power flow to the output 64.

Figure 4:
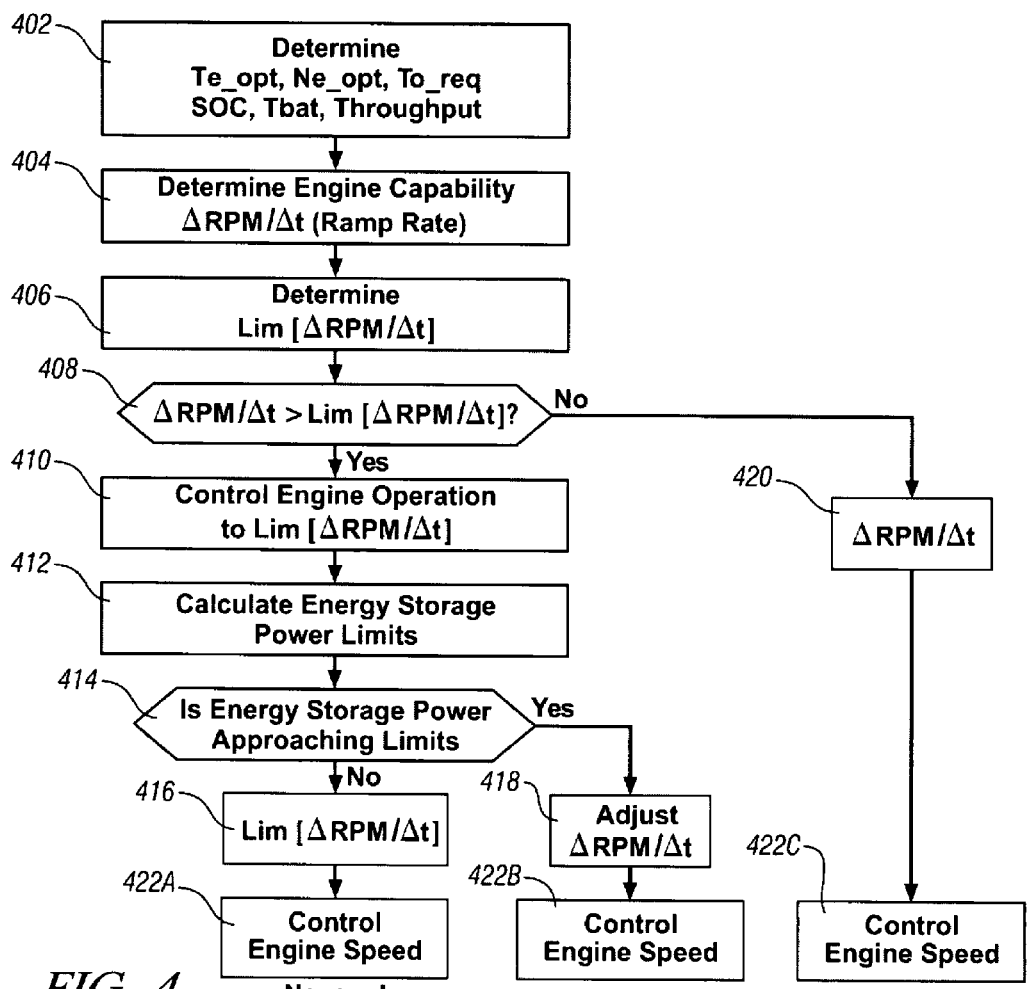
FIG. 4 is an algorithmic flowchart, in accordance with the present invention; and, FIGS. 5 and 6 are data graphs, in accordance with the present invention.

Referring now to FIG. 4, there is depicted a flowchart for an algorithm, in accordance with the invention. The algorithm embodies a method for controlling operation of a hybrid powertrain, e.g., the exemplary hybrid powertrain described hereinabove, to generate an output at shaft 64 characterized in terms of rotational speed, No and torque, To. The algorithm is preferably regularly executed during one of the aforementioned control module loop cycles, e.g., 40 milliseconds, during ongoing engine and vehicle operation, to generate an engine speed command, Ne_cmd. The method comprises determining optimum engine operation and an engine capability, and an operator torque request (Step 402). States of parameters of the electrical energy storage device are monitored (Step 402). A limit to the engine operating capability is determined based upon the optimum engine operation and the engine capability (Steps 404, 406). Power limits of the energy storage device are determined based upon the states of the parameters of the energy storage device (Step 412). The limit to the engine capability is adjusted based upon the power limits of the energy storage device (Step 418). The engine operation is controlled based upon the engine capability and the adjusted limit to the engine capability (Step 422A, B, and C). Electric power transmitted from the energy storage device to the electric machine is controlled to meet the operator torque request based upon the engine operation, which comprises determining power output from the engine with the engine operation controlled based upon the engine capability and the adjusted limit to the engine capability. Power is transmitted from the energy storage device to the electric machine to the electro-mechanical transmission and the power output is transmitted from the engine to the electro-mechanical transmission to generate the power flow to the output to meet the operator torque request. The overall operation is now described in greater detail.

The control algorithm is preferably executed to control operation of the powertrain to provide consistent vehicle launch characteristics. Vehicle launch conditions are defined broadly as conditions under which it is desirable to discharge the battery to provide vehicle propulsion, generally where the vehicle output speed is low and the desired output torque is high, such as acceleration from a stop, acceleration up an incline, and other operating conditions where it is desirable to discharge the ESS for vehicle propulsion. Launch conditions may be defined by a range of vehicle speeds and a range of desired vehicle output torques, or commanded output torques, associated with those vehicle speeds.

The method of FIG. 4 is now described in detail. Various operating states are determined, including the operator torque request (To_req) via inputs from the IU 13, optimum operating states of the engine, i.e., an optimum engine speed (Ne_opt) and torque output (Te_opt). The optimum engine speed (Ne_opt) and torque output (Te_opt) comprise engine operating conditions which achieve optimal engine operation at ideal operating conditions, including power output, fuel economy, and emissions. States of performance parameters of the electrical energy storage device (ESS) are also monitored (Step 402). The ESS performance parameters preferably include state of charge (SOC), battery temperature (Tbat), and electrical energy throughput (Throughput, in Amp-hours/hour). A exemplary method of determining parametric battery power limits for an ESS of an HEV which takes into account the battery SOC, temperature and amp-hour throughput is described in commonly assigned, co-pending U.S. patent application Ser. No. 10/965,671 and U.S. Pat. No. 6,946,818, which are both incorporated herein by reference in their entirety.

Engine capability, in the form of an engine speed ramp rate ($\Delta RPM/\Delta t$), is determined (Step 404). The engine speed ramp rate is based upon the overall capability of the engine to accelerate, taking into account various engine design and control factors, and optimized engine operation in terms of fuel consumption and engine torque generation. A typical engine can have a maximum ramp rate in the range of 600 rpm/second and an optimal ramp rate of about 300 rpm/sec.

Figure 6:
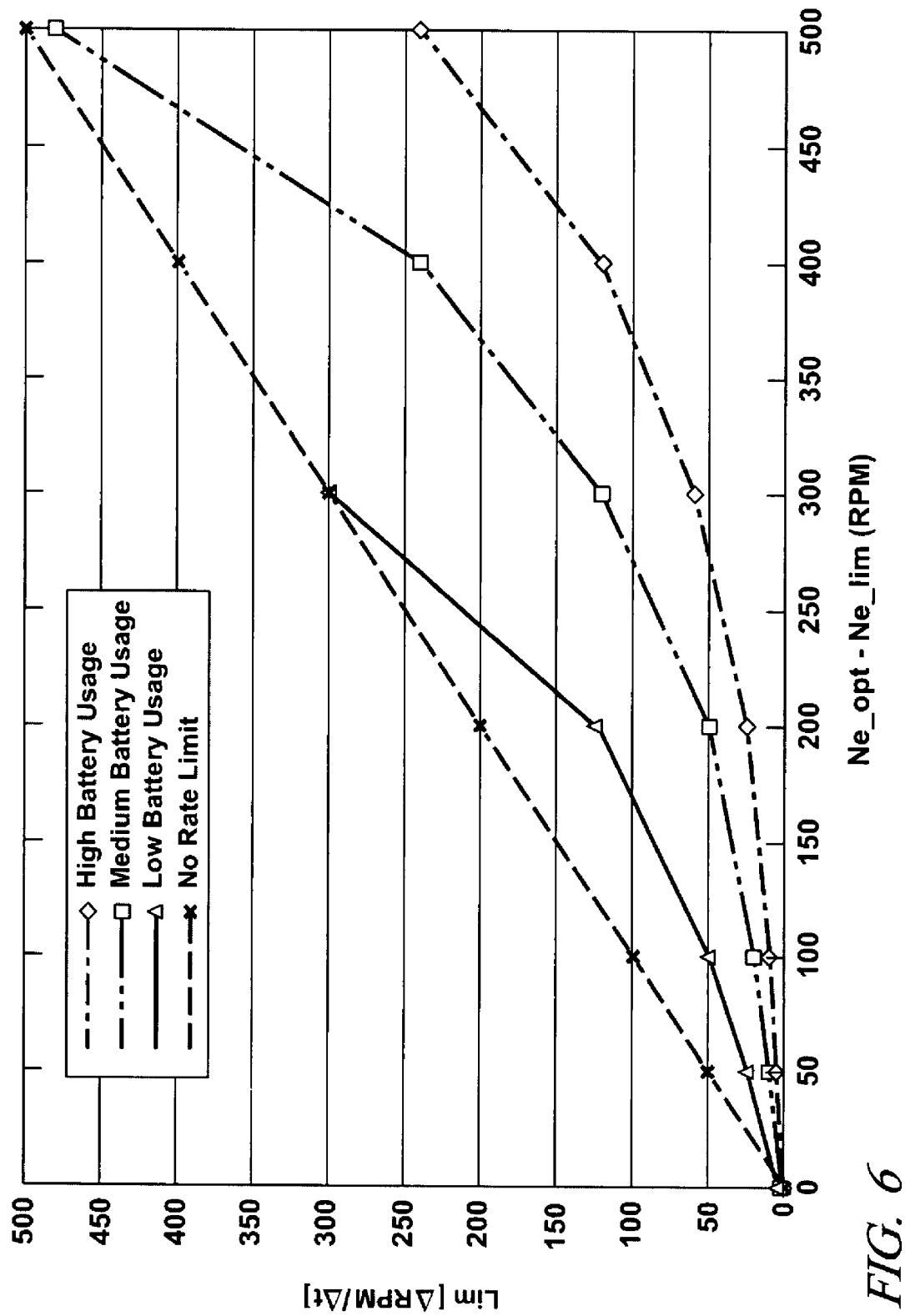

An engine speed ramp rate limit, $Lim(\Delta RPM/\Delta t)$, is determined based upon the optimum engine operation, the engine capability, and the performance parameters of the electrical energy storage device, in response to the operator torque request (Step 406). For example, when the battery SOC and temperature are within normal operating ranges, the ESS is capable of supplying energy to the electric machines MA, MB to carry much of an initial torque load for accelerating the vehicle to meet the operator torque request. Conversely, when the battery SOC is reduced, or the battery temperature is elevated, the ESS may not have the same capability for generating and carrying the output torque load. Thus, the engine speed ramp rate limit is used to manage and control the engine. The engine speed ramp rate limit preferably comprises an array of predetermined calibration limits, defined in terms of engine speed ramp rate $\Delta RPM/\Delta t$, and retrievable based upon factors related to the SOC, temperature and throughput, and the operator torque request, which further optimize the engine operation for the specific engine as applied to the specific EVT. An exemplary calibration is depicted with reference to FIG. 6, which graphically depicts values for the engine speed ramp rate limit, $Lim(\Delta RPM/\Delta t)$, determined based upon a difference between the optimal engine speed, Ne_opt, and a limited engine speed, Ne_lim, based upon battery usage. The limited engine speed, Ne_lim is preferably determined during each loop cycle based upon the current engine speed adjusted by the engine speed rate limit determined during the previous loop cycle, to limit the engine speed ramp rate based upon the battery usage, characterized by the states of the parameters of the energy storage device. The calibration lookup is based on the input and output of the rate limit function and the condition of the batteries as characterized by the states of the SOC, temperature and throughput. The calibration depicts high, medium, and low battery usage, which are determined based upon the parameters, i.e., high battery usage is characterized by low state of charge, high temperature, and high throughput, whereas low battery usage is characterized by high state of charge, medium temperature, and low throughput. As such, high battery usage leads to the most aggressive rate limiting, and low battery usage leads to the least aggressive rate limiting, which no rate limiting comprising an unlimited state, i.e., the engine speed changes as fast as the engine can increase in speed. This allows for tuning of the engine speed ramp rate limit based on the error between the input to the rate limit and the calibrated output, i.e., the optimal engine speed, $Ne\_opt$, and the limit engine speed, $Ne\_lim$.

Therefore when the system requests a large change in engine speed the engine speed ramp rate limit permits quick response to meet the system request, whereas when the change is small the engine speed is more heavily rate limited. The predetermined calibration limits are preferably determined during pre-production development of the powertrain, and stored in one of the control modules for retrieval by the algorithm during ongoing operation.

When, at step 408, the engine speed ramp rate is less than the engine speed ramp rate limit, i.e., $\Delta Ne/\Delta t < Lim(\Delta Ne/\Delta t)$, then the engine speed is adjusted by the engine speed ramp rate (Step 420), and the engine speed is controlled accordingly, in the form of a command for engine speed, $Ne\_cmd$ (Step 422C).

When, at step 408, the engine speed ramp rate is greater than the engine speed ramp rate limit, i.e., $\Delta Ne/\Delta t > Lim(\Delta Ne/\Delta t)$, then the engine operation is controlled based upon the engine speed ramp rate limit (Step 410). This includes calculating power limits of the ESS, based upon states for SOC, battery temperature, and energy throughput (Step 412). The power limits comprise predetermined power flow characteristics beyond which the ESS is damaged and battery life is reduced, including deep discharging or over-charging. When the ESS is not approaching the power limits, i.e., the states of the parameters have not surpassed predetermined thresholds, then the engine speed ramp rate is controlled to the engine speed ramp rate limit, i.e., $Lim(\Delta Ne/\Delta t)$ (Step 416) and the engine speed is controlled accordingly, in the form of the command for engine speed, $Ne\_cmd$ (Step 422A). The intent of this operation is to fully use electrical energy from the ESS through the electric motors MA and MB to generate tractive torque through the EVT to meet the operator torque request.

When the ESS approaches the power limits, i.e., the states of the parameters have attained or surpassed predetermined thresholds, then the limited engine speed ramp rate, i.e., $Lim(\Delta Ne/\Delta t)$ is adjusted by an amount sufficient to avoid exceeding with the energy storage and power limits of the ESS, thus preventing damage to the ESS (Step 418). This is preferably accomplished using a proportional-derivative type control loop that monitors the rate at which the energy storage power is approaching the limit and correspondingly adjusts the engine speed ramp rate up to the predetermined limit in order to maintain an offset from the power limit. The engine speed is controlled accordingly, in the form of the command for engine speed, $Ne\_cmd$ (Step 422B). In such situation, the limited engine speed ramp rate, i.e., $L_{IM}(\Delta Ne/\Delta t)$, is selectively increased by an amount that can be as much as necessary up to the ramp-rate capability of the engine, limited by a final engine speed command, $Ne\_cmd$.

Controlling the engine speed comprises generating the engine speed command, $Ne\_cmd$, which is communicated to the ECM for controlling operation of the engine. When the engine speed command is determined, as described above, the system controller 43 determines required torque outputs from MA and MB to meet the operator torque request, taking into account the contribution of the engine to meet the operator torque request. Electric power is transmitted from the energy storage device to the electric machines to meet the operator torque request based upon the engine operation, including the adjusted limit to the engine speed command, simply described as Eq. 1:

$$Ta+Tb+Te=To\_req. \qquad [1]$$

The electrical power transmitted from the energy storage device to the electric machines is converted to mechanical torque and transmitted to the electro-mechanical transmission and the power output is transmitted from the engine to the electro-mechanical transmission to generate the power flow to the output to meet the operator torque request. The system controller commands transfer of electrical power from the ESS to the electric machines MA, MB, in conjunction with the engine operation to meet the speed command, $Ne\_cmd$, to meet the operator torque request, $To\_req$.

Thus, during each loop cycle, the algorithm acts to control and limit increase in the engine speed and increase utilization of the electrical energy to generate tractive torque, so long as the battery limits are not exceeded. When battery limits are exceeded, the engine utilization is increased by adjusting the engine speed ramp rate to cause more of the tractive power to be supplied by the engine. Engine torque output is increased by an amount necessary to achieve the engine speed ramp rate and the operator torque request. The new logic also links the engine ramp rate to the current state of the energy storage system such that limits are not exceeded if the energy storage is operating at its limits. Basically the engine ramp rate is phased out as the system approaches the maximum desired use of the batteries at the current operating points. This allows the new logic to adapt for different duty cycles since it tries to use the energy storage system up to the extent of their limits during all transients.

Figure 5:
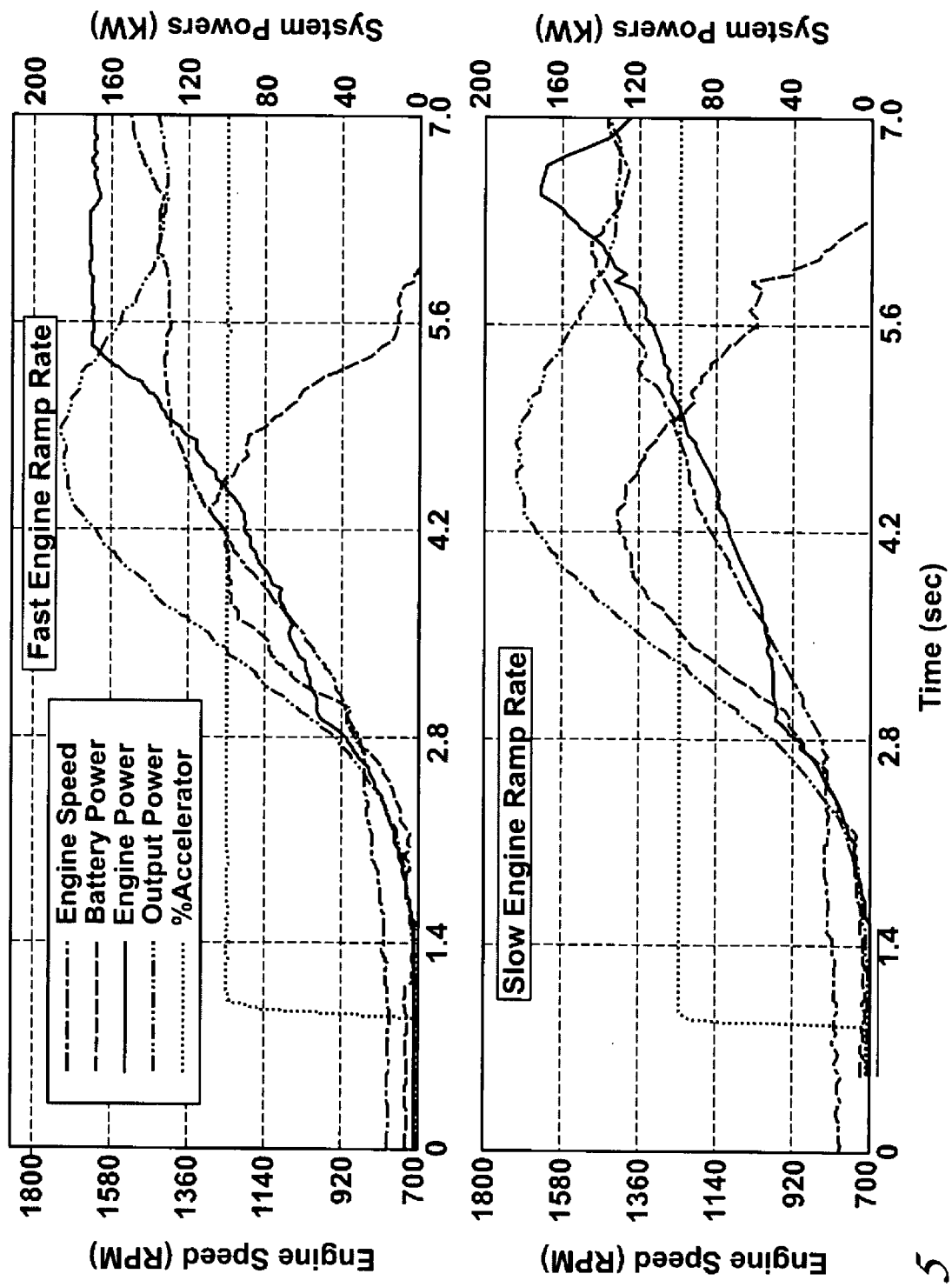

Referring now to FIG. 5, results of operating the exemplary HEV powertrain system in response to a step-input torque request from a vehicle operator are graphically depicted, wherein different aspects of the invention are depicted. The upper portion of FIG. 5 depicts accelerator pedal input, engine speed (rpm) engine and battery power (kW) and output power for normal operation, whereas the lower portion depicts accelerator pedal input, engine speed (rpm), engine and battery power (kW) and output power for operation wherein the engine speed is limited in accordance with the invention described herein. As depicted, the output power is the same for operation in both modes, whereas the engine speed ramp-rate and maximum engine speed are limited, with the battery power providing a larger portion of the overall power during the acceleration event.

Due to the dynamic charge/discharge conditions experienced by the ESS in the HEV, and the desire to monitor and control states of the battery parameters associated with these conditions, the discharge power of the ESS is limited by control actions taken as a result of the states of the ESS parameters. Consequently, when the maximum battery discharge power is limited or reduced in conjunction with such control actions, the vehicle launch performance is reduced as compared to situations wherein the batteries are capable of full utilization and provision of the maximum battery discharge power. Thus the battery discharge power limits are expanded during the launch such that more battery power is utilized for short times to provide consistent vehicle performance, without damaging the battery.

The foregoing discussion discloses and describes exemplary embodiments of the present invention. One skilled in the art will readily recognize from such discussion, and from the accompanying drawings and claims that various changes, modifications and variations may be made therein without departing from the true spirit and fair scope of the invention as defined by the following claims.

The invention claimed is:

1. Method for controlling operation of a hybrid powertrain, the hybrid powertrain comprising an internal combustion engine, an energy storage system, an electric machine, and an electro-mechanical transmission, the energy storage system and electric machine electrically-operatively coupled for power flow therebetween; and, the engine, electric machine, and the electro-mechanical transmission mechanically-operatively coupled to transmit power therebetween to generate a power flow to an output member, the method comprising:
 determining optimum engine operation, a maximum engine speed ramp rate, and an operator torque request;
 monitoring states of parameters of the electrical energy storage device;
 determining a limit to the engine speed ramp rate based upon the optimum engine operation, the maximum engine speed ramp rate, and the states of the parameters of the electrical energy storage device;
 determining power limits of the energy storage device based upon the states of the parameters of the energy storage device;
 adjusting the limit to the engine speed ramp rate based upon the power limits of the energy storage device; and,
 controlling engine operation based upon the maximum engine speed ramp rate and the adjusted limit to the engine speed ramp rate.

2. The method of claim 1, further comprising controlling power transmitted from the energy storage device to the electric machine to meet the operator torque request based upon the engine operation.

3. The method of claim 1, wherein determining optimum engine operation and the maximum engine speed ramp rate comprises: determining an optimum engine speed and engine torque, and, determining an engine speed ramp rate corresponding to a maximum operating capability of the engine.

4. The method of claim 1, wherein monitoring states of the parameters of the energy storage device comprises monitoring a state-of-charge, a temperature, and an electrical energy throughput.

5. The method of claim 2, wherein controlling power transmitted from the energy storage device to the electric machine to meet the operator torque request based upon the engine operation further comprises:
 determining a power output from the engine, the engine operation controlled based upon the engine speed ramp rate and the adjusted limit to the engine speed ramp rate; and,
 transmitting energy from the energy storage device to the electric machine to the electro-mechanical transmission and transmitting the power output from the engine to the electro-mechanical transmission to generate the power flow to the output member to meet the operator torque request.

6. The method of claim 2, comprising increasing the limit to the engine speed ramp rate when the power transmitted from the energy storage device approaches the power limits of the energy storage device.

7. The method of claim 4, wherein determining the limit to the engine speed ramp rate based upon the states of the parameters of the energy storage device comprises controlling the engine speed ramp rate based upon a predetermined calibration retrievable based upon factors related to one of the state-of-charge, the battery temperature, and, the electrical energy throughput.

8. The method of claim 6, wherein increasing the limit to the engine speed ramp rate when the power transmitted from the energy storage device approaches the power limits of the energy storage device comprises: increasing the engine speed ramp rate sufficient to avoid surpassing power limits of the energy storage device.

9. Method for controlling operation of an internal combustion engine, comprising:
 mechanically-operatively coupling the engine to an electro-mechanical transmission mechanically-operatively coupled to an electric machine to transmit power therebetween to generate a power flow to an output member;
 electrically-operatively coupling the electric machine to an energy storage system and the electro-mechanical transmission to transmit power flow therebetween;
 determining optimum engine operation and an engine speed ramp rate, and an operator torque request;
 monitoring usage of an electrical energy storage device;
 determining an engine speed ramp rate limit based upon the optimum engine operation, the engine speed ramp rate, and the usage of the electrical energy storage device;
 determining power limits of the energy storage device based upon the usage of the energy storage device;
 adjusting the engine speed ramp rate limit based upon the power limits of the energy storage device; and,
 controlling engine operation based upon the engine speed ramp rate and the adjusted engine speed ramp rate limit.

10. The method of claim 9, further comprising: controlling transfer of energy from the electric energy storage device to the electric machine to generate the power flow to the output member to meet the operator torque request.

11. The method of claim 9, wherein determining the engine speed ramp rate limit based upon the usage of the energy storage device comprises:
 monitoring a state-of-charge, a temperature, and an electrical energy throughput of the energy storage device to determine the battery usage; and,
 adjusting the engine speed ramp rate limit based upon the battery usage.

12. The method of claim 11, wherein adjusting the engine speed ramp rate limit based upon battery usage comprises increasing the engine speed ramp rate with increasing battery usage.

13. The method of claim 11, further comprising adjusting the engine speed ramp rate limit based upon a difference between an optimum engine speed and a limit engine speed determined based upon the engine speed ramp rate.

14. The method of claim 12, wherein the battery usage is characterized by the states of the parameters of the SOC, temperature and throughput.

15. Method for controlling elements of a hybrid powertrain during a transient maneuver, the elements comprising an internal combustion engine, an electric energy storage device, an electric machine, and an electro-mechanical transmission, the method comprising:
 mechanically-operatively coupling the engine to the electro-mechanical transmission mechanically-operatively coupled to the electric machine to transmit power therebetween to generate a power flow to an output member;
 electrically-operatively coupling the electric machine to the energy storage system and the electro-mechanical transmission to transmit power flow therebetween;
 monitoring an operator torque request;

determining an optimum engine speed ramp rate and a maximum engine speed ramp rate;

monitoring usage of the electrical energy storage device;

determining a limit to the engine speed ramp rate based upon the optimum engine speed ramp rate, the maximum engine speed ramp rate, and the usage of the electrical energy storage device;

determining power limits of an energy storage device associated with the usage of the energy storage device;

adjusting the limit to the engine speed ramp rate when the power limits of the energy storage device approach predetermined limits;

controlling engine operation based upon the engine speed ramp rate and the adjusted limit to the engine speed ramp rate, and, controlling torque output from the electric machine to meet the operator torque request based upon the engine operation.

16. The method of claim 15, further comprising controlling power transmitted from the energy storage device to the electric machine to meet the operator torque request based upon the engine operation.

17. The method of claim 16, wherein controlling power transmitted from the energy storage device to the electric machine to meet the operator torque request based upon the engine operation further comprises:

determining a power output from the engine, the engine operation controlled based upon the engine speed ramp rate and the adjusted limit to the engine speed ramp rate; and, transmitting energy from the energy storage device to the electric machine to the electro-mechanical transmission and transmitting the power output from the engine to the electro-mechanical transmission to generate the power flow to the output member to meet the operator torque request.

* * * * *